Oct. 14, 1930  D. C. LOPEZ  1,778,265
TAPPING MACHINE
Filed July 21, 1927  2 Sheets-Sheet 1

INVENTOR.
D. C. Lopez.
BY
ATTORNEY

Oct. 14, 1930.     D. C. LOPEZ     1,778,265
TAPPING MACHINE
Filed July 21, 1927     2 Sheets-Sheet 2
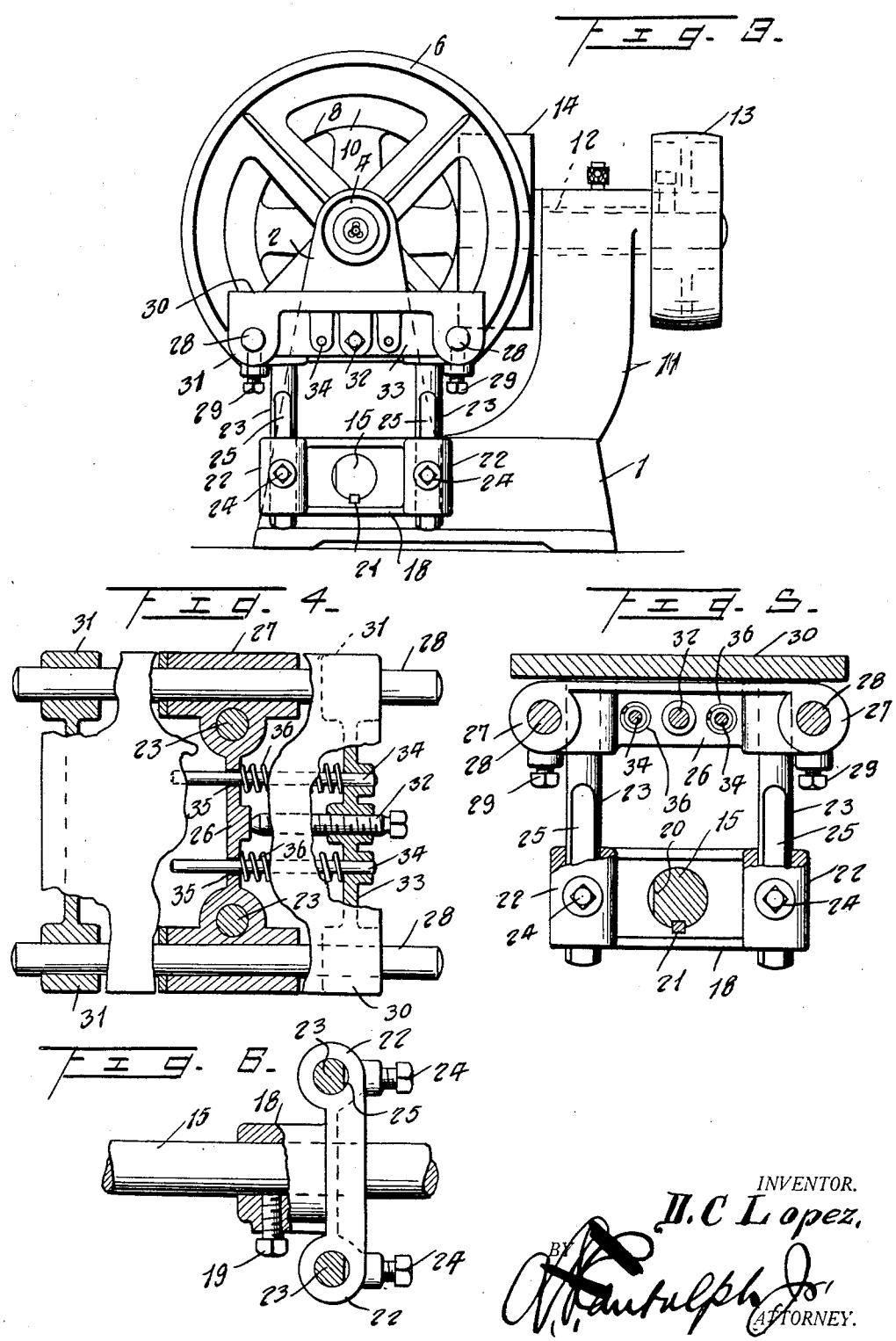

Patented Oct. 14, 1930

1,778,265

UNITED STATES PATENT OFFICE

DAVID CALRERA LOPEZ, OF CHICAGO, ILLINOIS

TAPPING MACHINE

Application filed July 21, 1927. Serial No. 207,506.

The invention relates to a tapping machine, and especially to improved means for cutting interior threads, and has for its principal object the provision of means by which the rotation of the spindle may be readily secured for cutting operation, and a reverse rotation of the spindle may be readily secured for withdrawing the tapping tool from the bored hole.

A further object of the invention is the provision of a tapping machine comprising a rotatable and slidable spindle carrying spaced friction disks, and a driven friction wheel adapted to selectively engage said disks for driving the tapping tool forwardly in boring the hole, and for withdrawing the tapping tool from the hole after the boring is completed.

A further object of the invention is the provision of a tapping machine including a tool carrying spindle that is rotatably and slidably mounted of a work table to carry the article to be tapped that is manually actuated toward the spindle and the tapping tool to insure driving connection between the friction disk on the spindle and a friction wheel to bore the hole in the article, said table being returned to its normal position by spring means and while being returned to its normal position the spindle is moved axially in the opposite direction of its initial movement to engage another disk thereon with the friction wheel to reverse the rotation of the spindle and to withdraw the tapping tool from the threaded opening.

Figure 1:
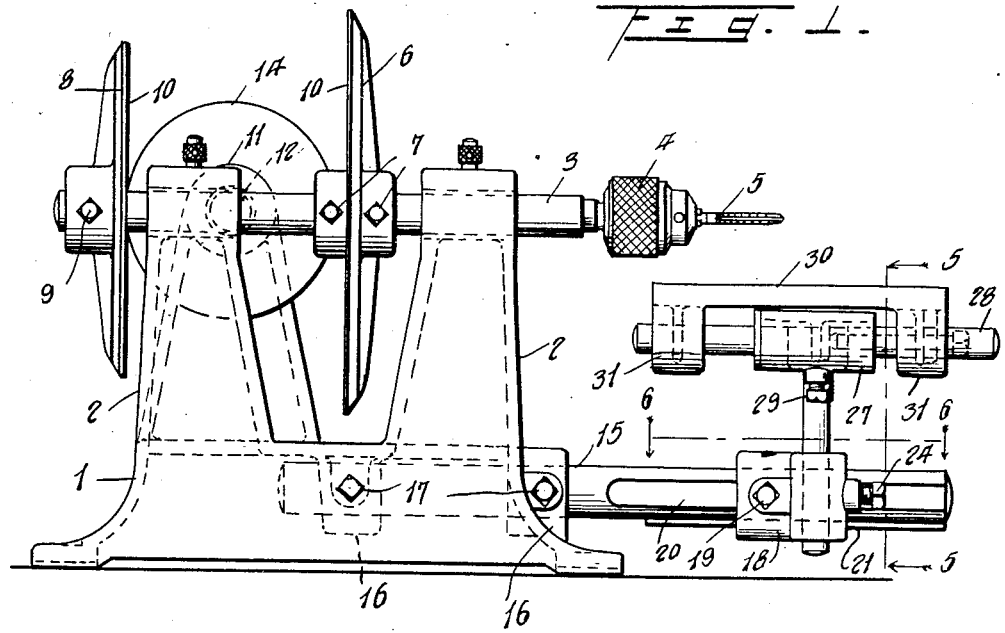
Figure 2:
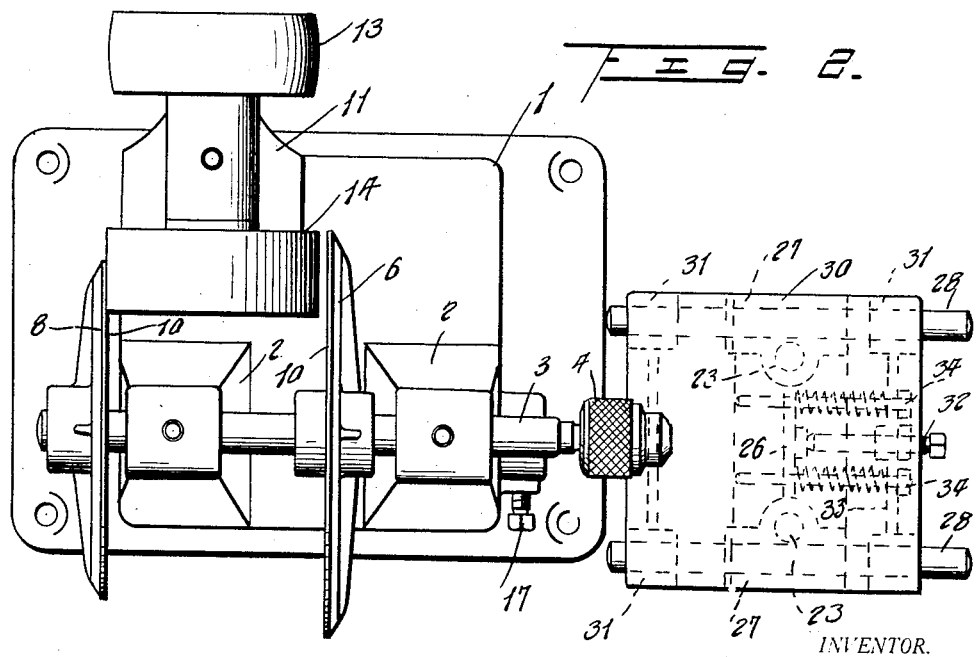

The invention will be described in detail hereinafter and will be found illustrated in the accompanying drawings in which Figure 1 is a side view in elevation of the improved tapping machine, Figure 2 is a top plan view, Figure 3 is a front end view, Figure 4 is a top plan view of the work table partly broken away and in section, Figure 5 is a sectional detail of the work table on a plane indicated by the line 5—5 of Figure 1 some of the parts being partly broken away, and Figure 6 is a similar view on a plane indicated by the line 6—6 of Figure 1.

In the drawings similar reference characters will be used to designate corresponding parts throughout the several views.

The improved tapping machine comprises a supporting member having a base 1 on which are mounted alined pedestals 2 having each a journal at the top for journaling spindle 3 that is also slidable in the journals for the purpose hereinafter stated. A tool holding chuck 4 is carried by the spindle 3 to hold the thread cutting tap tool 5. Secured to spindle 3 and located intermediate said standards 2 is a disk 6, that is made fast thereon by means of set screws 7 engaging the hub of the disk, said disk 6 being adapted to be actuated by the mechanism hereinafter described to drive the spindle 3 and the tool 5 in cutting threads. Another disk 8, smaller in diameter than disk 6 is also made fast to the spindle 3 at one end thereof, beyond standard 2, in spaced relation with the disk 6 by means of set screw 9 engaging the spindle 3 through the hub of the disk. Disk 8 is adapted to be actuated by the mechanism hereinafter described to drive the spindle 3 in a reverse direction to withdraw the tap 5 from the threaded opening in the article. Disks 6 and 8 are preferably faced with a layer of leather or other suitable material, designated 10 for the most effectual operation of the machine.

Base 1 supports another pedestal 11 in which is journaled a drive shaft 12, whereon is secured suitable driving means, like a belt pulley 13, for driving said shaft 12, and a friction wheel 14 is carried by said shaft 12 and adapted to selectively engage with its peripheral surface said disks 6 and 8. As the shaft 12 is rotated in one direction it will be apparent that when disk 6 is engaged with the wheel 14 by sliding the spindle 3 rearwardly by engagement of the article to be tapped with the end of the tool 5 the spindle will be rotated to drive the tool 5 to cut a threaded opening in the article, while by reversing the pressure of the article on the tool 5 when the hole has been tapped the spindle 3 will be moved axially in a reverse direction and the disk 8 by engaging the wheel 14 the spindle will be rotated in a reverse direction to withdraw the tool from the threaded opening.

Secured in base 1 is an arm 15 that engages bearing members 16, and is secured in position by means of set screws 17. 18 indicates a block that is adjustably mounted on the arm 15, and secured in adjusted position thereon by means of set screw 19, the arm being provided with a flat surface 20 to seat said set screw, and the block is held from rotation on the arm by a feather line 21. Arranged on each side of the arm 15, and forming extensions of the block 18 are tubular bearing members 22 in which are adjustably mounted pedestals 23 and secured in position in said bearing members 22 by means of set screws 24 engaging flat surfaces 25 on said pedestals. 26 indicates the work table supporting member that is supported on pedestals 23, and have bearings 27 in which are adjustably secured guide rods 28, that are secured in position by means of set screws 29. Work table 30 is slidably mounted on guide rods 28 by means of bearing members 31, said work table 30 being adapted to carry the article to be tapped that may or may not be secured to the table, and as hereinbefore stated when the article is moved toward the tool 5 and engages the tool the spindle 3 will be moved rearwardly to engage the disk 6 with the wheel 14 to drive the spindle to operate the tap. 32 indicates an adjusting screw that threadedly engages the front 33 of the table and permits the movement of the table in working position by engaging the supporting member 26. 34 indicates rods secured to the front 33 and movable in openings 35 of supporting member 26 that carry coil springs 36 terminally engaging the supporting member 26 and the front face 33 of the table and that serves to return the table to its original position after the tapping operation is completed and as it will be obvious that the article carried by the table will also be withdrawn with the table, the springs 36 will serve to actuate the spindle 3 axially to move the disk 6 out of engagement with the wheel 14 and engage the disk 8 therewith and thereby reverse the rotation of the spindle 3 and withdraw the tool 5 from the threaded opening in the article.

What is claimed is:—

A tapping machine comprising a spindle having a tool carrying chuck at its inner end, a base having spaced standards thereon provided with means for slidably journaling said spindle, spaced friction disks of different diameter secured on said spindle and having their adjacent friction faces substantially parallel and containing friction means thereon, the larger of said friction disks being positioned between said standards and the smaller one being positioned at the outer end of said spindle and outside of the outermost one of said standards, a stationary pedestal on said base and being provided with a journal, a driving shaft rotatably mounted in said journal and positioned constantly parallel to the friction faces on said disks, and a friction wheel positioned between said disks adjacent said outermost standard, being secured to the end of said driving shaft and having a cylindrical friction face for selectively engaging the friction faces of said disks, the larger one of said disks being moved against said wheel by said spindle and chuck during working of the machine and the smaller disk engaging the wheel when the article worked on is being withdrawn, to drive said spindle and tool faster during the withdrawing of the article than during the working of said tool.

In testimony whereof I affix my signature.

DAVID CALRERA LOPEZ.